United States Patent
Pühl et al.

[11] Patent Number: 6,047,384
[45] Date of Patent: Apr. 4, 2000

[54] RAPID RECOVERY AND START-UP SYSTEM FOR PERIPHERAL SYSTEMS

[75] Inventors: Andreas Pühl, Grünwald; Wolfgang Bauer; Heinz-Werner Ramke, both of München; Karl Ruppert, Puchheim, all of Germany

[73] Assignee: Siemens Aktiengesellschaft, Munich, Germany

[21] Appl. No.: 08/983,531

[22] PCT Filed: Jul. 16, 1996

[86] PCT No.: PCT/EP96/03125

§ 371 Date: Jan. 20, 1998

§ 102(e) Date: Jan. 20, 1998

[87] PCT Pub. No.: WO97/04385

PCT Pub. Date: Feb. 6, 1997

[30] Foreign Application Priority Data

Jul. 21, 1995 [EP] European Pat. Off. ............... 95111536

[51] Int. Cl.⁷ .................................................. G06F 9/445
[52] U.S. Cl. .......................... 714/2; 714/2; 714/3; 714/4; 714/5; 714/20; 714/21; 709/713
[58] Field of Search .................................. 714/2, 3, 4, 5, 714/21, 20; 709/713

[56] References Cited

U.S. PATENT DOCUMENTS

| | | | |
|---|---|---|---|
| 4,296,465 | 10/1981 | Lemak | 710/130 |
| 4,443,850 | 4/1984 | Harris | 710/23 |
| 4,578,789 | 3/1986 | Middleton et al. | 714/2 |
| 4,914,576 | 4/1990 | Zelley et al. | 714/21 |
| 4,920,479 | 4/1990 | Hashiguchi | 370/260 |
| 5,539,898 | 7/1996 | Trevett | 711/167 |
| 5,754,781 | 5/1998 | Kitta | 709/213 |
| 5,761,405 | 6/1998 | Tadamura et al. | 714/18 |
| 5,761,422 | 6/1998 | Westin et al. | 709/213 |
| 5,784,645 | 6/1998 | Saegusa et al. | 710/33 |
| 5,815,680 | 9/1998 | Okumura et al. | 710/131 |

FOREIGN PATENT DOCUMENTS 0 320 274  6/1989  European Pat. Off. .
0 483 433  5/1992  European Pat. Off. .

*Primary Examiner*—Robert W. Beausoliel, Jr.
*Assistant Examiner*—Bryce Bonzo
*Attorney, Agent, or Firm*—Hill & Simpson

[57] ABSTRACT

The start-up of a computer system takes place rapidly using a computer system having a recovery system which collects data for the recovery in parallel fashion in a common memory so that the data can be transferred to peripheral units of the computer system. The collection begins with collecting the data into a local memory of a processor and then transferring the data to the common memory before transferring the data to the peripheral units.

5 Claims, 3 Drawing Sheets

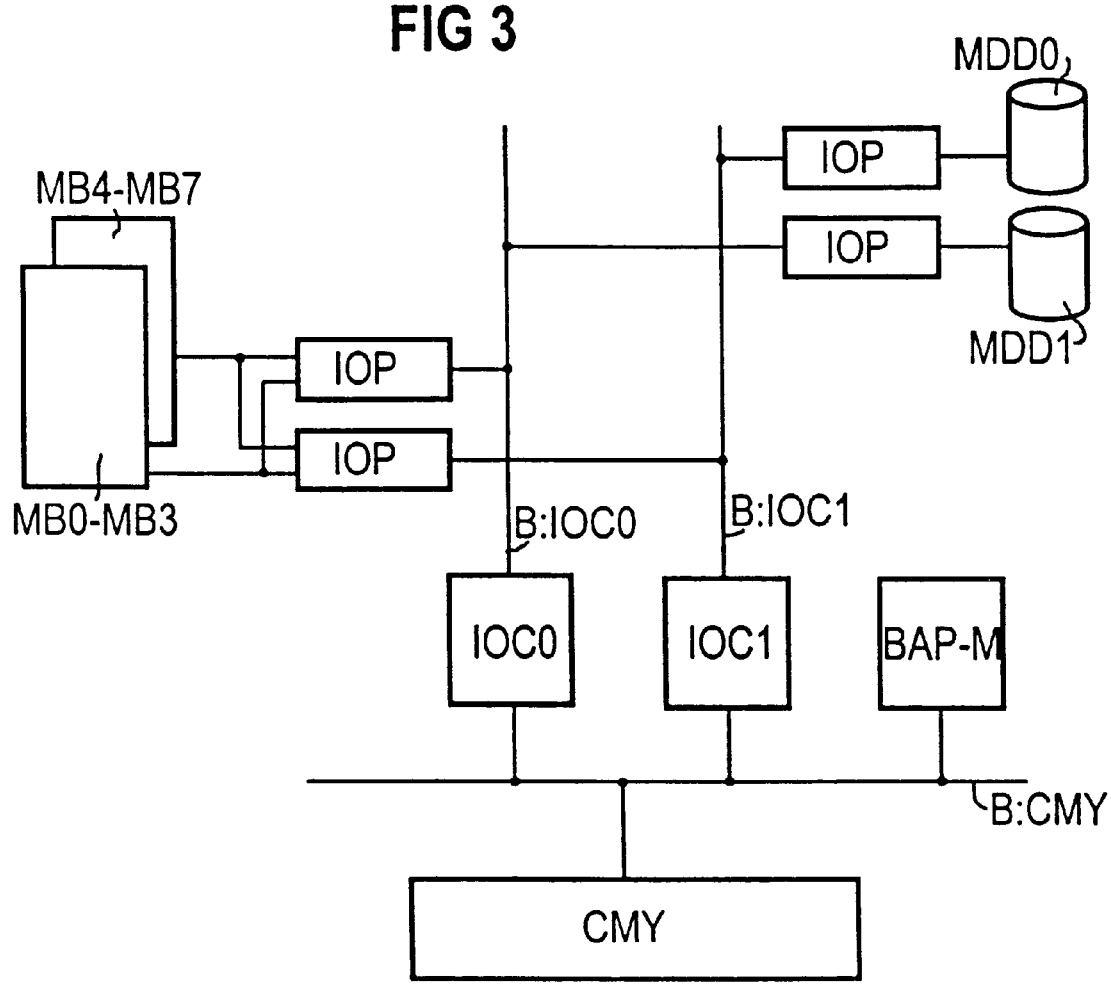

RAPID RECOVERY AND START-UP SYSTEM FOR PERIPHERAL SYSTEMS

BACKGROUND OF THE INVENTION

1. Field of the Invention

The present invention relates generally to a computer system having data collection to peripherally units for rapid start-up.

2. Description of the Related Art

Computer systems, in particular telephone exchange systems, need start-up systems (recovery systems) which, when a computer system is being commissioned, or following the occurrence of an alarm, reproduce once more as quickly as possible a state of software and hardware that is suitable for the operation of the computer system. Starting up the computer system is necessary when it is first switched on, when the computer installation program system is changed or following a system failure. In the case of a computer system whose structure comprises a central processor system and peripheral processor systems, the system start-up is controlled by the central processor system of the computer system. The central processor system in this case in particular controls the necessary reloading of the peripheral processor systems with data (code data, control data and so on).

SUMMARY OF THE INVENTION

The present invention provides a computer system which carries out the reloading of the peripheral processor systems as rapidly (and reliably) as possible. Such reloading is necessary when starting up the computer system.

This and other objects and advantages of the invention are achieved by a computer system having a central processor system which controls the computer system centrally, the central processor system including central processors and a common memory connected to the computer system through a bus system, peripheral processor systems which control peripheral units of the computer system, and a recovery system which is contained in the central processor system and which carries out a recovery of the peripheral units by collecting the data to be transferred to the peripheral units for the recovery in the common memory before the transfer of the data, controlling the central processors in such a way that they carry out the collection in parallel fashion.

The parallel collection of the data to be loaded into the peripheral processor systems by all the processors of the central processor system makes rapid start-up of the computer system possible.

A further embodiment of the invention provides that a central processor in each case includes a local memory in which is collected the data to be transferred in advance, before the central processor forwards the data to the common memory. The temporary buffering of the data in the local memories of the central processors achieves a dynamically optimized use of the central memory.

A further embodiment of the invention provides a specific central processor that transfers data into the peripheral units, while the remaining central processors are at the same time collecting further data to be transferred. This configuration further shortens the start-up time of the computer system.

An embodiment of the invention provides that the specific central processor transfers the data to be transferred into the peripheral units using the direct memory access method. This embodiment further shortens the start-up time of the computer system.

An embodiment of the invention provides that the specific central processor transfers the data to be transferred into the periphery in broadcast mode into the periphery. The start-up time is further shortened by the parallel downloading of the data in the broadcast mode.

BRIEF DESCRIPTION OF THE DRAWINGS

In the following text, an exemplary embodiment of the invention is explained in more detail using the drawing, the drawing comprising three figures.

FIG. 3 is a block diagram of the hardware components of an exemplary computer system of the invention.

DETAILED DESCRIPTION OF THE PREFERRED EMBODIMENTS

Figure 1:
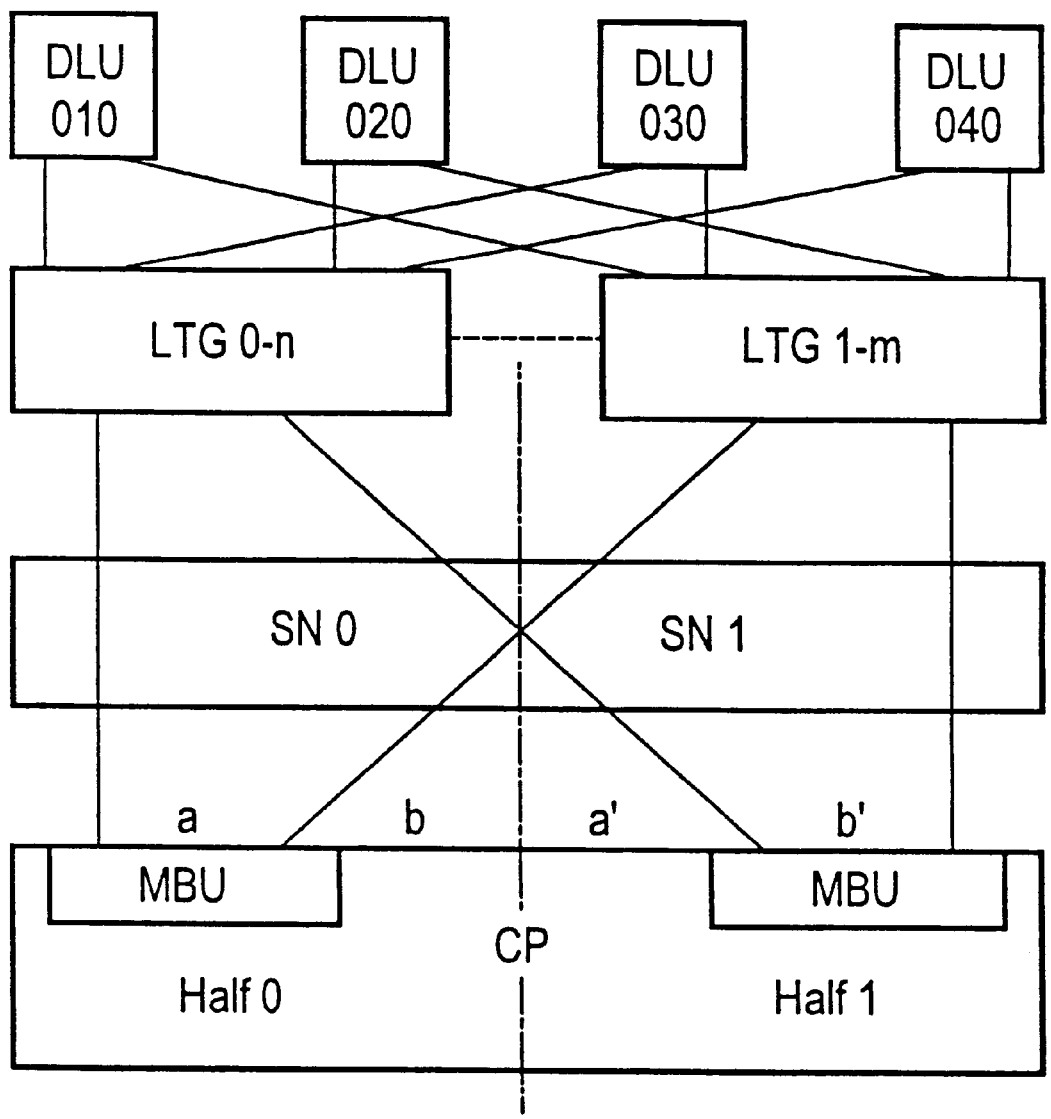
FIG. 1 is a functional block diagram of the hardware structure of an exemplary computer system according to the present invention.

FIG. 1 shows the hardware structure of an exemplary computer system, namely of a switching system for telecommunications. The switching system comprises a central processor system CP, which is connected via a central switching network SN (shown as SN0 and SNI) to the peripheral line trunk groups LTG (shown as LTG0-n and LTG1-m) and comprises, as interfaces to the central switching network, message buffer units MBU. Connected in turn to the peripheral line trunk groups LTG are digital line units DLU, which form the termination of the overall switching system with respect to the subscriber. The overall computer system is laid out in duplicate (as Half 0 and Half 1) from the central processor system CP as far as the line trunk groups LTG, for which reason, even in the event of many hardware failures, substitute switching can be performed and the subscriber thus notices nothing about the failure.

However, if on account of a serious failure in the periphery it is nevertheless necessary to initialize the overall periphery (for example with respect to the subscriber data) anew, then this recovery operation must take place very rapidly, since the operation of the periphery is interrupted during this time and the operating quality of the switching system depends to a great extent on the duration of the failure.

The recovery operation substantially comprises two operations which proceed in parallel, specifically a collection operation and a transfer operation. In the case of the collection operation, the peripheral data to be collected are taken from the database, collected in the local memories LMY (shown in FIG. 2) of the central processors and copied from the local memories LMYs into the common memory CMY. The transfer operation then transfers the peripheral data compiled in the common memory CMY into the periphery.

Figure 2:
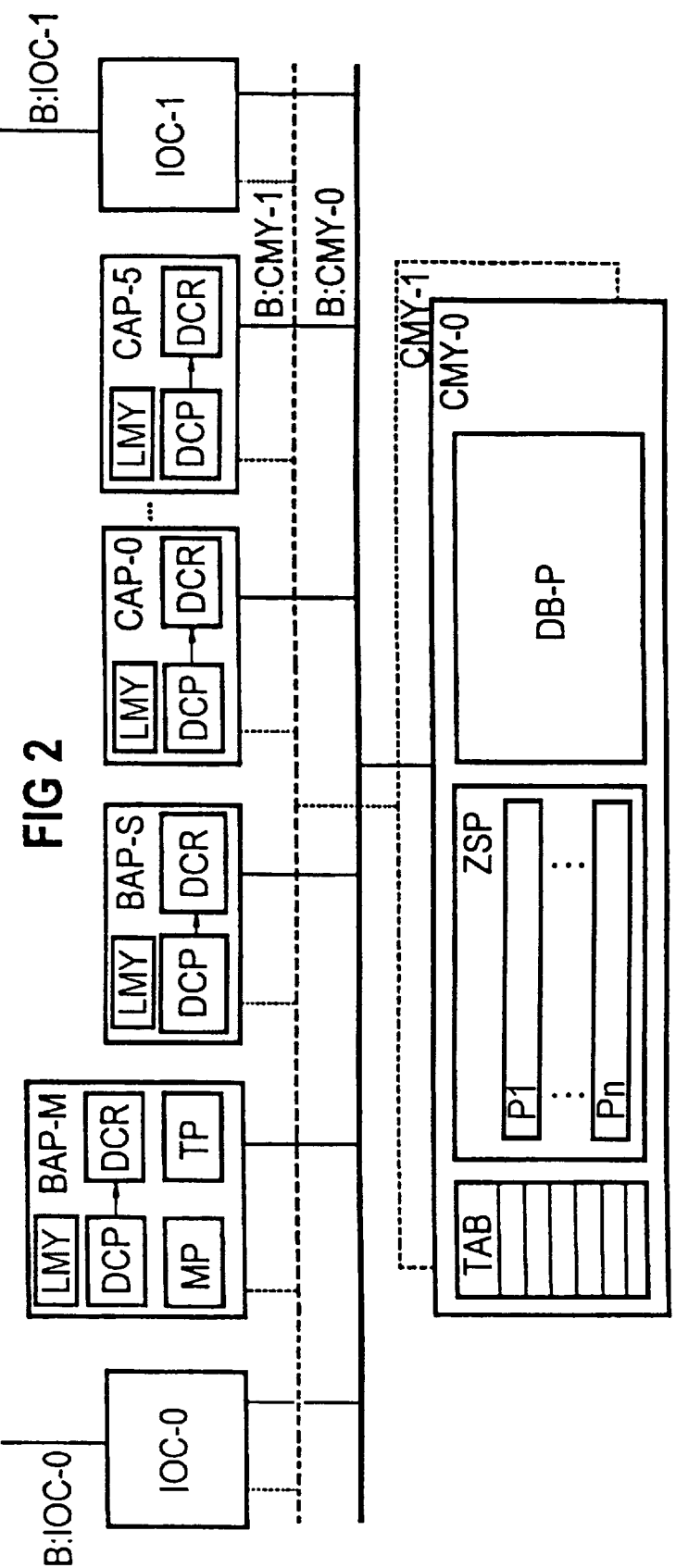
FIG. 2 is a block diagram showing the hardware and software structure of a central processor system.

FIG. 2 shows the hardware structure of the central processor system CP, as well as the software structure that is present for the recovery system according to the invention.

The hardware structure of the central processor system substantially comprises the central processors BAPM, BAPS, CAP0, . . . , CAP5, which are connected via a duplicated bus system B:CMY0, B:CMY1 to the duplicated common memory CMY0, CMY1. In addition, the CP comprises input/output controllers IOC0, IOC1, which are in particular responsible for the data transfer between the common memory CMY and the message buffer units MBU.

The software structure, according to the invention, of the recovery system comprises, as illustrated in FIG. 2, a collection process DCP, which triggers appropriate collection routines DCR for carrying out the collection operation, a transfer process TP for transferring the data into the periphery and a monitor process MP, which monitors the collection processes carried out in parallel in the central processors using a central table TAB in the common memory.

The central table TAB serves for the coordination of the parallel collection of the data. It is built up by the operating system at the beginning of the peripheral start-up and initialized by the monitor process.

The collection processes in the central processors are likewise started by the operating system in the case of a start-up having to be carried out, and serve the purpose of collecting from a database DB, for example DB-P, the data to be transferred into the periphery and buffering them in the form of data streams in a special memory area ZSP also referred to as a buffer area, of the common memory, before they are transferred into the periphery.

In order to carry out their work, the collection processes and the transfer process make use of the central task table, which indicates the sequence in accordance with which the data are collected and transferred. In this way, the central task table supports the transparent collection and transfer of the data.

The following flow scheme therefore applies:
1. Starting the collection processes and the monitoring process (monitor process)
2. Collecting the data in the local memory LMY
3. Copying the data from the local memory LMY to the common memory CMY
4. Transferring the data from the common memory CMY into the periphery.

In order to carry out the collection, the collection processes in each case fetch a task from the central task table, collect the data described by the task from the database DB (depending on the size of the common memory CMY, the database DB is already present, wholly or at least partly, in the common memory CMY) and transfer them into a special memory area ZSP of the common memory CMY, before the data are transferred further from there, by the transfer process, into the periphery. The collection processes are started individually in each active central processor by the operating system. Before they begin with the collection of data, an internal initialization operation is carried out, which concomitantly includes reporting to the monitor process in the central processor BAP-M. After these initialization operations, the following tasks are carried out cyclically:

Requesting a task from the central task table,
Checking whether the handling of the task is possible,
Collecting (in advance) the data specified for this task in the central task table in the local memories LMY of the central processors,
Transferring the collected data into the special memory area of the common memory CMY.

The collection is performed independently of the transfer. The sequence of the data (various "types of data") is immaterial to the collection process. The collection mechanism is thus flexible with respect to future changes with regard to the data to be transferred into the periphery (amounts of data and types of data), that is to say independent of changes in this regard.

As specified above, the data are first stored in the local memory of a collecting central processor, before they are transferred into the special (buffer) memory area ZSP of the common memory. Temporary storage in the local memory of a central processor has several advantages. If an error occurs during the collection operation, this has effects only on a single central processor and its dedicated memory management system. In this case, it is not necessary to include the common memory at the same time in the error handling. A further advantage is to be seen in the fact that some of the data to be collected can still be collected even if the special memory area ZSP in the common memory is currently no longer capable of accepting further data.

The collection routines use a common interface for the collection of the data. The collection routines in various central processors can call this common interface for various parts of a quantity of data to be collected for a task. If the local memory in a central processor is too small for the quantity of data to be collected within the context of a task, for example, the quantity of data for the task can thus be collected by several processors.

If, on the other hand, data to be collected are located in a data area of the central database which is not loaded into the common memory, then that part of the database which contains these data must first be copied from the magnetic storage disk MDD, such as MDD0 to MDD1, into the common memory, see FIG. 3.

The buffer area ZSP is managed by a special controller, the so-called memory manager. In order to obtain access to the buffer, an access routine provided by the memory manager must be called. This routine permits memory space to be requested and released once more. The user of this routine must be prepared to be allocated less memory space or, if appropriate, even no memory space.

In the following text, the compilation of the data to be transferred into the periphery in the special memory area ZSP of the common memory CMY is explained in more detail.

The various central processors first collect the data, with the aid of the collection processes running in them, in their dedicated local memories LMY. Various collection routines DCR, which are needed by the various collection processes for the collection of the data, select the necessary data from the database DB in the common memory. This selection is necessary, since not all the data which are located in the database also have to be loaded into the periphery.

The size of the buffer ZSP that is available can be varied and depends on the physical structure of the common memory. The buffer ZSP is subdivided into groups P1, . . . , Pn. A group, after it has been filled with data to be collected, is released for the transfer process for the transfer. A group thus constitutes a transfer unit. Each group in turn comprises very small memory segments (for example 16 KByte or 32 KByte; the size can be optimized), which contain the data to be transferred. A memory segment constitutes the smallest memory unit that can be managed by the manager of the buffer. A collection process in each case needs one memory segment for the storage of the data collected in one collection operation in the buffer area ZSP.

What has been said will be clarified in the following text using an example. According to a first job, a quantity of data of 46 KB is to be collected. The smallest memory segment is assumed to be 32 KB in size. Processor A receives this first job upon request to the monitoring process. It marks this job in the central table TAB and starts the collection operation in its local memory. After the collection operation has been completed, this is entered in the central table, and the transfer into the common memory is requested in the monitoring process. If free memory is contained in the group Px, the data are transferred from the local memory into the common memory. At the same time, it is established that hitherto only part of the data of the job has been collected. Once the group Px has finally been compiled, that is to say all the memory segments of this group are filled with peripheral data, the group is closed, that is to say released for the transfer into the periphery, and a group Py, which is still free, is opened. A processor B (this processor could by chance be the same processor as previously) interrogates the monitoring process about data to be collected. If the monitoring process (as in this example) establishes that still further data must be collected with respect to a job for which data have been collected in the group Px, then with respect to this job a follow-up job is initially allocated to the processor B. Only when no further data of the preceding group (group Px) have to be collected is the group Py filled by "new" jobs, that is to say jobs which are not follow-up jobs.

In summary, what has been said previously signifies the following:

1. A data stream, that is to say a quantity of data to be collected for one job (task), may be divided.
2. Parts of a data stream must be loaded into the periphery in successive groups.
3. Different parts of a data stream can be collected by various processors.
4. If a collection process fails, then the same job can be taken over by a different collection process. The decision about this is made by the monitor process using criteria such as "multiple failure", "hardware failure" or "software failure". The monitor process is thus of decisive significance for the security in the critical start-up phase of the computer system.

The collection routines DCR used by the collection processes DCP, and the access of these routines to the database of the peripheral data proceed under special conditions, that is to say there are no further running processes which at the same time have access to the database of the peripheral data. For this reason, the collection routines of the recovery operation are runtime optimized in that they do not use any special access or protection mechanisms, such as LOCK sequences.

As already mentioned, the transfer process TP serves to transfer the data into the periphery and, like the monitor process MP, is implemented exclusively in the central processor BAP-M. The transfer process is optimized to the effect that it comprises a transparent downloading mechanism (mechanism which knows nothing of data contents and data formats), which comprises the application of the direct memory access method (DMA method for short) and the transfer via an active and a passive message channel.

The monitor process monitors the collection of the data with the aid of various timers, that is to say it uses one timer in each case for each collection process. By means of this monitoring mechanism, the monitor process recognizes the failure of a processor or a possible software error (for example an endless loop in a process, a database error, ...).

The collection routines, which proceed in the various central processors, are implemented as independent working processes. For synchronization between the collection processes amongst one another on the one hand and between the collection processes and the monitor process on the other hand, use is made of the central table, which is also designated the task table here. The task table is built up after an internal configuration table has been built up. The internal configuration table contains a copy of the periphery and a copy of the states of the periphery. The monitor process compiles the task table as a function of the configuration table and uses it in order to monitor the various collection processes.

After the data have been collected by the central processors, references to the collected data are handed over to the transfer process in the BAP-M for the subsequent transfer of the data to the periphery (put more precisely, to the peripheral processors of the line trunk groups LTG). Using the references, the BAP-M then handles the transfer to the line trunk groups. In doing this, it uses the DMA method already mentioned, that is to say it supplies an input/output processor connected via the input/output controller with appropriate parameters from the central table TAB, and arranges for it to carry out the transfer. The input/output processor then procures for itself, via the input/output controller, a time slot on the bus B:CMY and, via the latter, executes the transfer of the data from the common memory CMY to the message buffer units MBUs.

FIG. 3 shows the hardware HW structure of the central processor CP from the point of view of the transfer operations between magnetic storage disk MDD and local memory LMY during the prior collection, between local memory LMY and common memory CMY during copying and finally between common memory CMY and message buffer unit MBU during the transfer operation. The central processor system CP illustrated in FIG. 3 contains eight message buffer units MBU, which in each case can handle eight broadcast settings at the same time.

In order to ensure optimized transferring of the data from the message buffer unit MBUs to the trunk line groups LTGs or the subscriber line units, the following two methods in particular are used. One method is the simultaneous transferring of identical data to a multiplicity of line trunk groups, and transferring using so-called broadcast settings per message buffer unit MBU. The second method is transferring the port data of the digital line units via the active channels a,b and passive channels a' and b' at the same time. On the basis of the two methods cited, it is ensured that all the available resources of the computer system are utilized for transferring the port data.

In the following text, the central task table TAB is explained in more detail. The TAB constitutes the information center for the collection routines DCR and transfer routines.

In order to read the content of the individual fields of the central task table or to change it by writing, various access routines are made available. The access to the central task table is therefore possible only via these access routines. The access routines of the central task table support a multiprocessor access. The monitor process is used for the purpose of coordinating the access.

The central task table is subdivided into two parts. A first part is used to describe the peripheral units, for which the respective task collects data, and in order to mark the instantaneous state of the task. A second part is used for the management of the parameters of the collection and transfer routines, and in addition by the monitor process in order to write or to read control data.

Some important fields of the central task table are explained in more detail in the following text.

A "Task" field describes the peripheral unit for which data are collected. After a central processor has obtained this information from the central task table, it copies this information into its local memory.

A "Task Control" field is used to monitor the current state of a task and to support the multiprocessor concept. The "Task Control" field may assume various values, whose significance is explained in more detail in the following text.

The value "FREE" indicates that the task has not yet been processed. Data have not been collected up till now. The task management is not yet being used.

The value "SNAPPED" indicates that a task is reserved by a processor for the processing. After the variable "SNAPPED" has been set, no further collection process can reserve this task.

The value "COLLECT DATA" indicates that the task is currently being processed. The data are therefore currently being collected.

The value "READY FOR TRANSFER TO CMY" indicates that data have been collected in the local memory of a central processor, and the transfer to the common memory is imminent. If there is sufficient memory available in the common memory, then these data are transferred to the common memory. In the other case, the collection process must wait for a renewed start.

The value "DATA COLLECTION FINISHED" indicates that the processing of the task has been completed, that is the data have been collected and stored in the common memory. Data are therefore ready to be transferred into the peripheral units.

The value "UNPROCESSABLE" indicates that the task cannot be carried out. The Task Control field receives this value when data cannot be collected or the task administration is not accessible.

A value "TRANSFER TO PERIPHERY" indicates that the task is currently being used by a transfer routine. Following the completion of the transfer operation, the monitor process is informed and sets a new value for the status field.

A value "TASK IS PROCESSED" indicates that all the data of the task have been transferred into the periphery.

The fields of the second part are explained in the following text.

A "COUNTER" field designates one of the groups P1, . . . , Pn by a number in each case. This number is used by the transfer process in order to transfer the data compiled into the respective group to the peripheral units.

A "PROCESSOR ID" field describes the processor which is handling the task by a number. This processor number is used for the identification of the collection process and by the monitor process for the purpose of monitoring and handling the tasks, processors and processes.

A "PERIPHERY UNITS" field describes the receiving peripheral unit. This information is transferred to the central task table by the respective collection routine. Furthermore, this field describes the corresponding units via which the data are transferred, for example message channel, MBU or partner line-trunk group. The content of this field is used for broadcast settings and/or by transfer routines.

A "MEMORY LENGTH" field describes the maximum possible memory area which can be used by a collection routine for the buffering of the data. If insufficient memory area is available, further calls to the collection routines are nevertheless permitted. Specifically, the collection routines can initially collect the data in the local memories and complete their collection operation later, when there is once more sufficient memory area available in the buffer on account of the transfer operations to the periphery running in parallel, in that they transfer into the buffer the data already collected in the local memories.

The "MEMORY LENGTH" field is initialized after the collection process has requested, via the monitor process, an appropriate memory area from the manager of the buffer ZSP, and has received it. The collection process requests this memory area as soon as the collection operation has been completed. It therefore provides for each task a strictly defined memory area for the collection of the data. The value of this field is transferred to the central task table as a parameter by the caller of the collection routines, namely the collection process.

A "MEMORY POINTER" field describes the pointer to the memory area in the common memory, in which the data indicated by the task are buffered or have already been buffered. The value of the pointer is initialized after a collection process has been allocated memory space by the memory manager and before the actual data collection operation begins. The initialized value also remains unchanged during the entire operation of transferring the data into the periphery. The value is transferred by the caller to the collection routines as a parameter.

A "CALL MARK FLAG" field describes the status of the data collection operation. The flag is passed back from the collection routines to the collection process. The flag is interpreted both by the collection process during the collection operation and by the transfer process during the transfer operation. The flag may assume the following values:

A value "FIRST RECOVERY CALL", which is supplied by the caller at the time of calling the first collection routine, that is to say by the collection process. This value is used for the initialization of the Call Mark flag.

A value "CALL AGAIN", which is passed back to the collection process by the collection routine called if there was not sufficient memory available in the common memory to accommodate the data to be collected by the collection routine. At the next call to the collection routine, this value is transferred by the caller to the collection routine. The collection routine then attempts once more to transfer the data already collected in the local memory to the buffer. The value "CALL AGAIN" also indicates to the transfer process that still more data have to be collected before the transfer.

A value "CALL NEXT DATATYPE" is passed back by a collection routine if still further types of data have to be transferred. This value indicates to the transfer process that it can transfer data with respect to the same task, which are to be transferred in the subsequent group, as previously, that is to say the previous configuration can be kept for transferring the data of this task. Otherwise, if the value "CALL NEXT DATATYPE" is present, the procedure of the collection process DCP and transfer process TP is as in the case of the value "CALL AGAIN".

A value "LAST CALL" is passed back by a collection routine if no further data are to be collected.

A value "NO CALL SUCCESS" is passed back by a collection routine if an error occurs during the collection operation.

All the abovementioned values are passed back by the collection routines to the collection process, which then enters them into the "Call Mark Flag" field of the central task table. They are then available for the transfer process to read there.

A "CHECKSUM" field is used for checking the data transfer. It ensures reliable data transfer. The value of the field is supplied by the collection routines called.

A "CONTINUATION POINTER" field contains a pointer which secures the internal state of a collection routine. If more than one call to a collection routine is necessary, the pointer returns unchanged by the collection process. The pointer is supplied back by the collection routine called.

A "DATA LENGTH" field describes the data length actually collected by a collection routine. The value is supplied by the collection routine called, and transferred to the transfer routine for the transfer of the data.

An "ERROR FLAG" field describes the state of a task which could not be handled at the first attempt. If it is of use, a further attempt is made to execute the task. The condition for executing a further attempt is satisfied if a processor fails during the data collection operation. However, if a collection process does not respond to an appropriate request, a data error or another software error is possible. In this case, a further attempt is of no use. The Error flag is changed only by the monitor process. A distinction may be drawn between the following values:

A value "NO ERROR" with which the Error flag is initialized and which indicates no error.

A value "TRY AGAIN", which is input if a processor fails. In the case of a task identified in this way, a further attempt is made to carry out the task.

A value "NO FURTHER TRY", which is input when the monitor process receives no reply from the collection process, and which prevents another collection process obtaining access to this task.

A "TASK IDENTIFICATION" field, which is used to transfer the data with the aid of the DMA method. The value of this field is passed back from a transfer routine which serves to set the broadcast mode. The value of this field is used by the internal management of the input/output processor IOP. The value of this field is also transferred by the transfer process to that transfer routine which transfers the data and to that routine which finally completes the broadcast operation.

Finally, a "SYNC. FIELD" field, which contains all the data which are necessary for the synchronization between the monitor process and the collection processes. Part of this field is the information that a new task has been started and, if necessary, detailed error information.

Although other modifications and changes may be suggested by those skilled in the art, it is the intention of the inventor to embody within the patent warranted hereon all changes and modifications as reasonably and properly come within the scope of his contribution to the art.

We claim:
1. A computer system, comprising:
   a) a central processor system which controls the computer system centrally, said central processor system including:
      central processors operable to control said computer system,
      a common memory, and
      a bus system connecting said common memory to said computer system,
   b) peripheral units for said computer system,
      peripheral processor systems which control said peripheral units of the computer system,
   c) a recovery system, which is contained in the central processor system and which carries out a recovery of the peripheral units in that it collects data to be transferred to the peripheral units for recovery in the common memory before transfer of said data, controlling the central processors in such a way that they carry out the collection in parallel fashion.

2. The computer system as claimed in claim 1, wherein each of said central processors includes a local memory in which is collected the data to be transferred in advance in each case, before said data is forwarded to the common memory.

3. The computer system as claimed in claim 1, wherein said central processors include a specific central processor that transfers data into the peripheral units, while remaining ones of said central processors are at the same time collecting further data to be transferred.

4. The computer system as claimed in claim 3, wherein said specific central processor transfers the data to be transferred into the periphery in accordance with a direct memory access method.

5. The computer system as claimed in claim 3, wherein said specific central processor transfers the data to be transferred into the periphery in broadcast mode into the periphery.

* * * * *